Oct. 25, 1927.
J. O. JOHNSON
FISHING TOOL FOR USE IN OIL WELLS
Filed Dec. 1, 1925
1,646,965
2 Sheets-Sheet 1
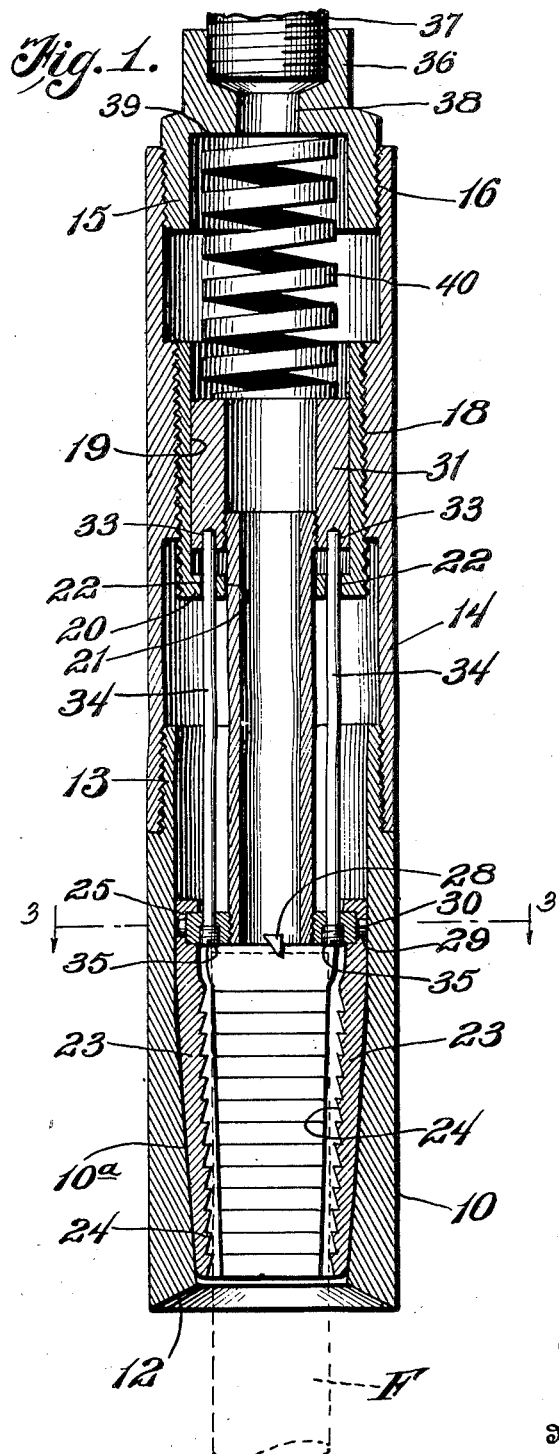
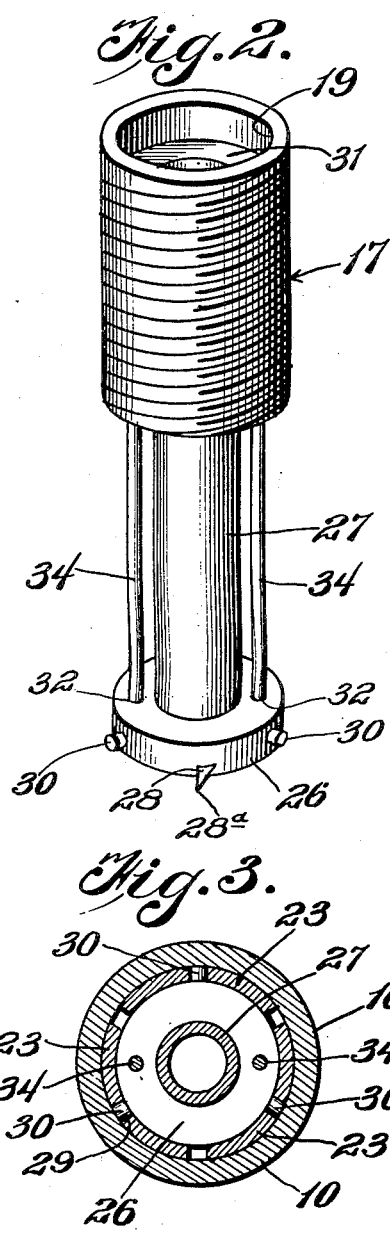
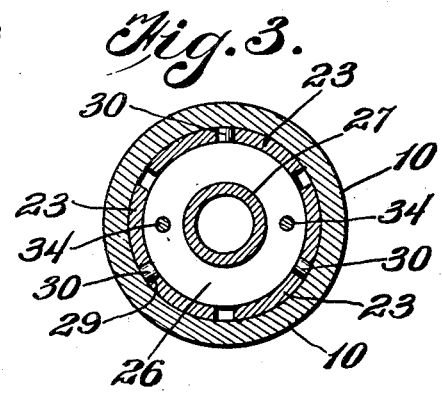
Inventor
Jesse O. Johnson
By Watson E. Coleman
Attorney Oct. 25, 1927.
J. O. JOHNSON
1,646,965

FISHING TOOL FOR USE IN OIL WELLS

Filed Dec. 1, 1925     2 Sheets-Sheet 2

Inventor
Jesse O. Johnson

By Watson E. Coleman
Attorney

Patented Oct. 25, 1927.

1,646,965

UNITED STATES PATENT OFFICE.

JESSE O. JOHNSON, OF MEXIA, TEXAS.

FISHING TOOL FOR USE IN OIL WELLS.

Application filed December 1, 1925. Serial No. 72,554.

This invention relates to fishing tools for use in oil wells and more particularly to the structure of a releasing overshot.

An important object of the invention is to provide means whereby the slips of the overshot can be positively shifted to release a gripped element from the overshot.

A further object of the invention is to provide a structure of this character which may be readily and cheaply produced and which will be durable and efficient in service.

These and other objects I attain by the construction shown in the accompanying drawings, wherein for the purpose of illustration is shown a preferred embodiment of my invention and wherein:—

Figure 1 is a vertical sectional view through an overshot constructed in accordance with my invention;

Figure 2 is a perspective view of the guide element removed and the slip support;

Figure 3 is a section on the line 3—3 of Figure 1;

Figure 4:
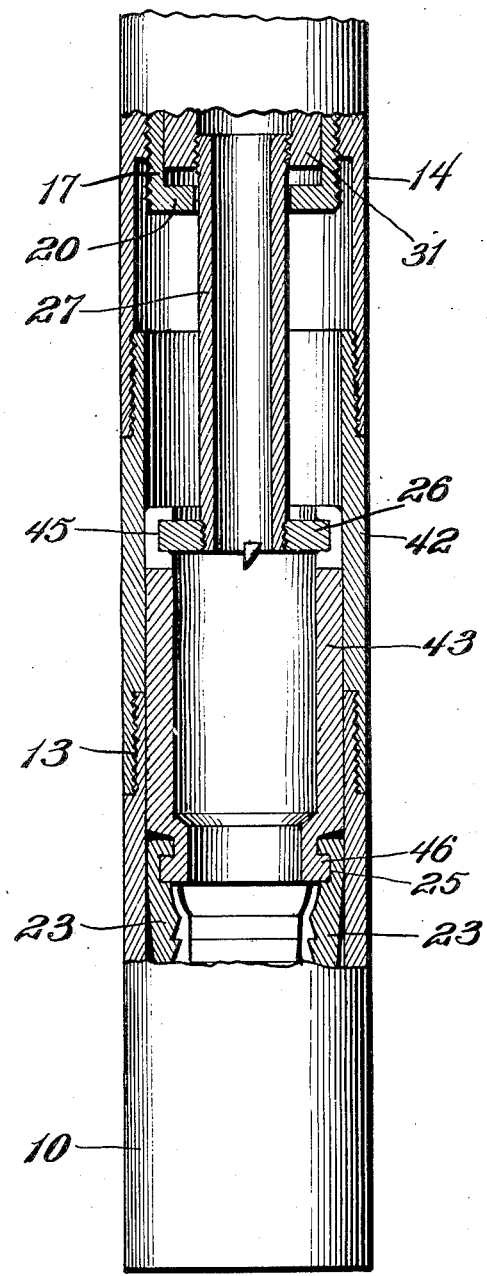
Figure 4 is a view partially in section showing a means for extending the overshot as to length.
Figure 5:
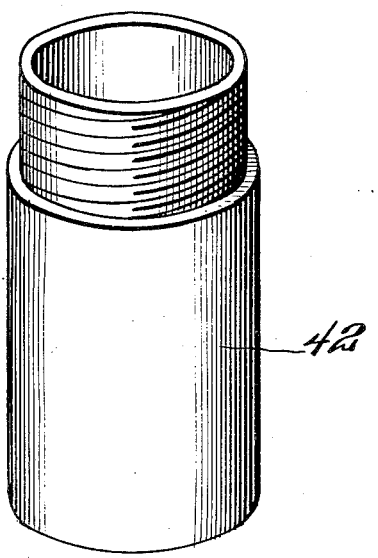
Figure 5 is a view of the extension coupling employed for connecting the bowl and sleeve 14 of the overshot.
Figure 6:
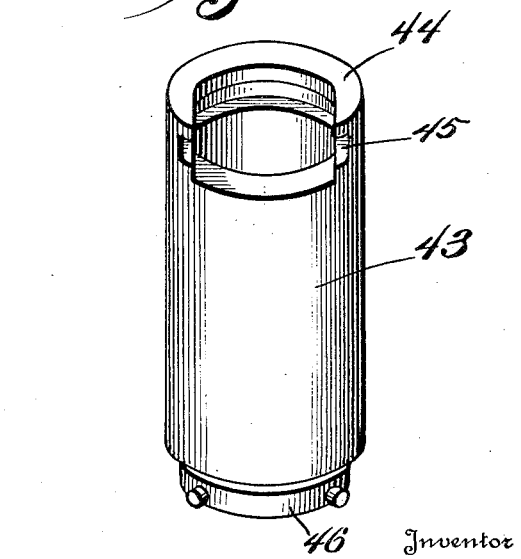
Figure 6 is a perspective view of the extension sleeve for the slip support.

Referring now more particularly to the drawings, the numeral 10 indicates a slip barrel having a downwardly tapering bore 10ª and suitably constructed at its lower end, as at 12, to direct the article which is to be gripped into the bore of the barrel. The upper end of the slip barrel has an externally screw-threaded section 13 for engagement with a connecting sleeve 14, the upper end of which is interiorly threaded for engagement with exterior threads formed upon the lower end of a coupling 15, as at 16.

The sleeve 14 is provided intermediate its ends with a guide 17, at present shown as removably mounted in the sleeve and having threaded connection therewith, as at 18. This guide element has a main bore 19 and is provided at its lower end with an inwardly directed flange 20 reducing the diameter of the lower end of the bore, as at 21. Through this flange are formed a pair of diametrically opposed openings 22, the purpose of which will presently appear.

Arranged within the barrel 11 is a set of slips 23, at present shown as three in number and as having upon their inner faces teeth 24 which, in the assembled relation of the slips, combine to produce a complete and substantially continuous right hand thread. Adjacent the top of each slip, the inner face thereof has formed therein a channel 25, these grooves combining in the assembled relation of the slips to produce a continuous annular groove receiving the periphery of a flange 26 rigidly attached to the lower end of a tube 27. The flange 26 is provided with a key 28 having a knife edge 28ª projecting below the surface thereof, for a purpose presently to appear. Each slip has formed therethrough a radial opening 29 extending from the base of the groove through the slip for the reception of a pin 30 projecting from the outer face of the flange 26. These pins are of sufficient length to prevent escape of the slips therefrom when the slips are in their uppermost or most greatly expanded position.

Threaded upon the upper end of the tube 27 is a guide sleeve 31. Formed through the flange 26, are a pair of diametrically opposed bores 32 which are screw-threaded and the sleeve 31 is provided with sockets 33 aligning with these bores and opening through the bottom thereof. Through the bores 32 are inserted guide pins 34, which, when they are fully seated in the sockets 33, still have their lower ends arranged within the bores 32. These pins are retained in position by threaded plugs 35 and pass through the openings 22 of the flange 20 of the guide element 17 while the tube 27 slidably fits the reduced bore 21 of this guide and the sleeve 31 slidably fits the main bore 19 thereof.

The coupling 15 has a reduced upper end 36 for engagement with the drill pipe 37 and this reduced upper end has a bore 38 communicating with the bore of the drill pipe which enlarges toward the lower end of the coupling and thereby produces a shoulder, as at 39, and faces downwardly to form a seat for the upper end of a spring 40, the lower end of which abuts against the upper end of the guide sleeve 31.

In the operation of the device, the bowl is lowered over the fish F until this fish comes into engagement with the lower end of the flange 26. At this time, the knife edge 28ª of the key 28 will engage the top of the fish so that the flange and fish are held against relative rotation. Since the tube 27 secured to the flange 26 has splined engagement with the threaded guide element, this guide element is also held against rotation with relation to the fish. Accordingly, if, at any time, the bowl is given a right hand rotation, the result will be that the guide element will be caused to elevate and finally engage the guide sleeve 31, withdrawing this guide sleeve and flange 26 vertically in the bore. Since the slips are engaged by the flange at their upper ends, they are withdrawn from the slip support formed by the downwardly tapering bore 10ª of the bowl and these slips will accordingly expand and release the fish permitting the overshot to be withdrawn therefrom. In event it is desired to extend the length of the overshot, this may be readily accomplished by employing an auxiliary sleeve 42 which is inserted between the intermediate sleeve 14 and bowl 10 and a coupling element 43 having at its upper end a semi-circular extension 44 grooved, as at 45, to receive the flange 26 and having at its lower end a flange 46 to engage in the grooves 25 of the slips. The coupling element 43 fits the interior of the upper end of the bowl and of the sleeve 42 and accordingly is held against disengagement from the flange 26 while in position therein. It will be obvious that the operation above described takes place whether this extended construction is employed or not.

Since the construction hereinbefore set forth is obviously capable of a certain range of change and modification without materially departing from the spirit of the invention, I do not limit myself to such specific structure except as hereinafter claimed.

I claim:—

1. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly and grooves formed in the inner faces of said slips at the upper ends thereof for the reception of the peripheral portions of said flange.

2. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly and grooves formed in the inner faces of said slips at the upper ends thereof for the reception of the peripheral portions of said flange, said member having a bore from end to end to provide a water course through the overshot.

3. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly and grooves formed in the inner faces of said slips at the upper ends thereof for the reception of the peripheral portions of said flange, pins projecting radially from said flange and openings in said slips into which said pins extend.

4. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly, grooves formed in the inner faces of said slips at the upper ends thereof for the reception of the peripheral portions of said flange, pins projecting radially from said flange and openings in said slips into which said pins extend, said member being tubular from end to end to thereby provide an axial water course through the overshot.

5. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly and grooves formed in the inner faces of said slips at the upper ends thereof for the reception of the peripheral portions of said flange, said guide having a bore and at its lower end being provided with an inturned flange reducing the diameter of the bore, said vertically movable member having at its upper end a sleeve fitting the main bore of the guide and having a tubular shank fittting the reduced bore of the guide.

6. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly and grooves formed in the inner faces of said slips at the upper ends thereof for the reception of the peripheral portions of said flange, said guide having a bore and at its lower end being provided with an inturned flange reducing the diameter of the bore, said vertically movable member having at its upper end a sleeve fitting the main bore of the guide and having a tubular shank fitting the reduced bore of the guide, openings in the flange of said guide and rods connecting the flange of the member and the sleeve thereof and directed through said openings.

7. In a releasing overshot, a barrel having a downwardly tapering bore, a guide supported from the upper end of the barrel, a plurality of slips within the barrel, a vertically movable member guided from and held from rotation by the guide and having an annular flange at its lower end, means urging the member downwardly, grooves formed in the inner faces of said slips at the upper ends thereof for the reception of the peripheral portions of said flange, and a key carried by the lower end of the vertically movable member and projecting below the lower face thereof to engage the upper end of a fish extended between said slips to thereby prevent relative rotation of the vertically movable member and fish, the guide limiting downward movement of the vertically movable member.

8. In a releasing overshot, a barrel having a slip seat, slips coacting with said seat, a guide threaded in the barrel above the seat, a member splined to the guide and having means coacting with the guide to limit downward movement thereof, means at the lower end of said member for engaging and supporting said slips and other means at the lower end of said member for engaging the upper end of a fish inserted between the slips to prevent relative rotation of the member and fish whereby upon rotation of the barrel, said member may be vertically shifted to disengage the slips from the fish.

9. In a releasing overshot, a barrel having a slip seat, slips coacting with said seat, a guide threaded in the barrel above the seat, a member splined to the guide and having means coacting with the guide to limit downward movement thereof, means at the lower end of said member for engaging and supporting said slips, other means at the lower end of said member for engaging the upper end of a fish inserted between the slips to prevent relative rotation of the member and fish whereby upon rotation of the barrel, said member may be vertically shifted to disengage the slips from the fish and a spring constantly urging the member downwardly.

10. In an overshot, a barrel having a slip seat, slips on said seat, a guide sleeve threaded in the barrel, a member splined to the guide sleeve and having means at its lower end for supporting said slips, said member and sleeve having coacting portions limiting downward movement of the member and means on said member for engaging a fish to hold the member against rotation with relation to the fish.

11. In a releasing overshot, a barrel having a downwardly tapering bore, a guide supported from the upper end of the barrel by a threaded connection to effect a relative feeding movement, gripping slips within the taper bore of the barrel, a vertically movable member slidably and non-rotatably mounted upon the guide and disposed for retention against rotation by frictional engagement with an object held by the slips, tension means forcing said member into such engagement, and means connecting the slips to the vertically movable member.

In testimony whereof I hereunto affix my signature.

JESSE O. JOHNSON.